(12) United States Patent
Coronado et al.

(10) Patent No.: US 7,934,026 B2
(45) Date of Patent: Apr. 26, 2011

(54) APPARATUS AND METHOD TO PRESERVE ONE OR MORE LOGICAL COMMUNICATION PATHS IN A DATA PROCESSING SYSTEM

(75) Inventors: Juan Alonso Coronado, Tucson, AZ (US); Roger Gregory Hathorn, Tucson, AZ (US); Dinh Hai Le, Tucson, AZ (US); Daniel Perkin, Tucson, AZ (US); Aaron Eugene Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/212,528

(22) Filed: Sep. 17, 2008

(65) Prior Publication Data
US 2010/0070663 A1 Mar. 18, 2010

(51) Int. Cl.
G06F 3/00 (2006.01)
G06F 13/00 (2006.01)
(52) U.S. Cl. .................. 710/38; 710/6; 710/19; 710/33
(58) Field of Classification Search .......................... None
See application file for complete search history.

(56) References Cited

U.S. PATENT DOCUMENTS

| 4,207,609 | A | | 6/1980 | Luiz et al. |
|---|---|---|---|---|
| 4,396,984 | A | * | 8/1983 | Videki, II ........................ 710/38 |
| 4,970,640 | A | | 11/1990 | Beardsley et al. |
| 6,209,059 | B1 | | 3/2001 | Ofer et al. |
| 7,383,381 | B1 | | 6/2008 | Faulkner et al. |

OTHER PUBLICATIONS

White et al., "FICON Native Implementation and Reference Guide," Redbooks—IBM; Oct. 2002, pp. 1-49.
Anderson et al., "Logical Control Unit," IBM Technical Disclosure Bulletin USA, Oct. 5, 1982, pp. 2390-2391.
International Search Report and Written Opinion dated Dec. 23, 2010.

* cited by examiner

Primary Examiner — Alan Chen
(74) Attorney, Agent, or Firm — Dale F. Regelman; Quarles & Brady LLP

(57) ABSTRACT

A method to preserve a logical communication path in a data processing system, that includes a host computer, a storage controller that comprises a first logical control unit ("LCU"), and a logical communication path that is in communication with the host computer and the first LCU, comprising deleting the first LCU and setting a first status for same. The method then configures a second LCU, and establishes a second status for same, wherein the second LCU includes all or a portion of the first LCU, but is not the same as the first LCU. The deleting, setting, configuring, and establishing are performed while maintaining the logical communication path, which is in communication with the second LCU.

17 Claims, 8 Drawing Sheets

APPARATUS AND METHOD TO PRESERVE ONE OR MORE LOGICAL COMMUNICATION PATHS IN A DATA PROCESSING SYSTEM

FIELD OF THE INVENTION

This invention relates to an apparatus and method to preserve one or more logical communication paths in a data processing system.

BACKGROUND OF THE INVENTION

Computing devices generate information. It is known in the art to store such information using a plurality of data storage devices disposed in an automated data storage system. An originating host computer may be in communication with a storage controller, using a plurality of logical communication paths per logical control unit (LCU) of the storage controller. To be able to access a volume from different logical paths, the host computer groups up to eight logical paths into one path group. When one logical communication path of the path group is lost, the host has all other logical paths of the path group to continue to access volumes in the LCU. However, when all logical paths are lost the host loses access to the volumes in the LCU. One way this may occur is when the LCU is deleted.

SUMMARY OF THE INVENTION

Applicants' invention comprises a method to preserve a logical communication path in a data processing system, where the data processing system comprises a host computer, a storage controller comprising a first logical control unit ("LCU"), and a logical communication path in communication with the host computer and the first LCU. The method deletes the first LCU, and sets a first status for the first LCU. The method then configures a second LCU comprising all or a portion of the first LCU, and establishes a second status for the second LCU, wherein the second LCU differs from the first LCU, and wherein the logical path interconnects the second LCU and the host computer. The method maintains the logical communication path during the deleting of the first LCU, setting the first status, configuring the second LCU, and establishing the second status.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5A:
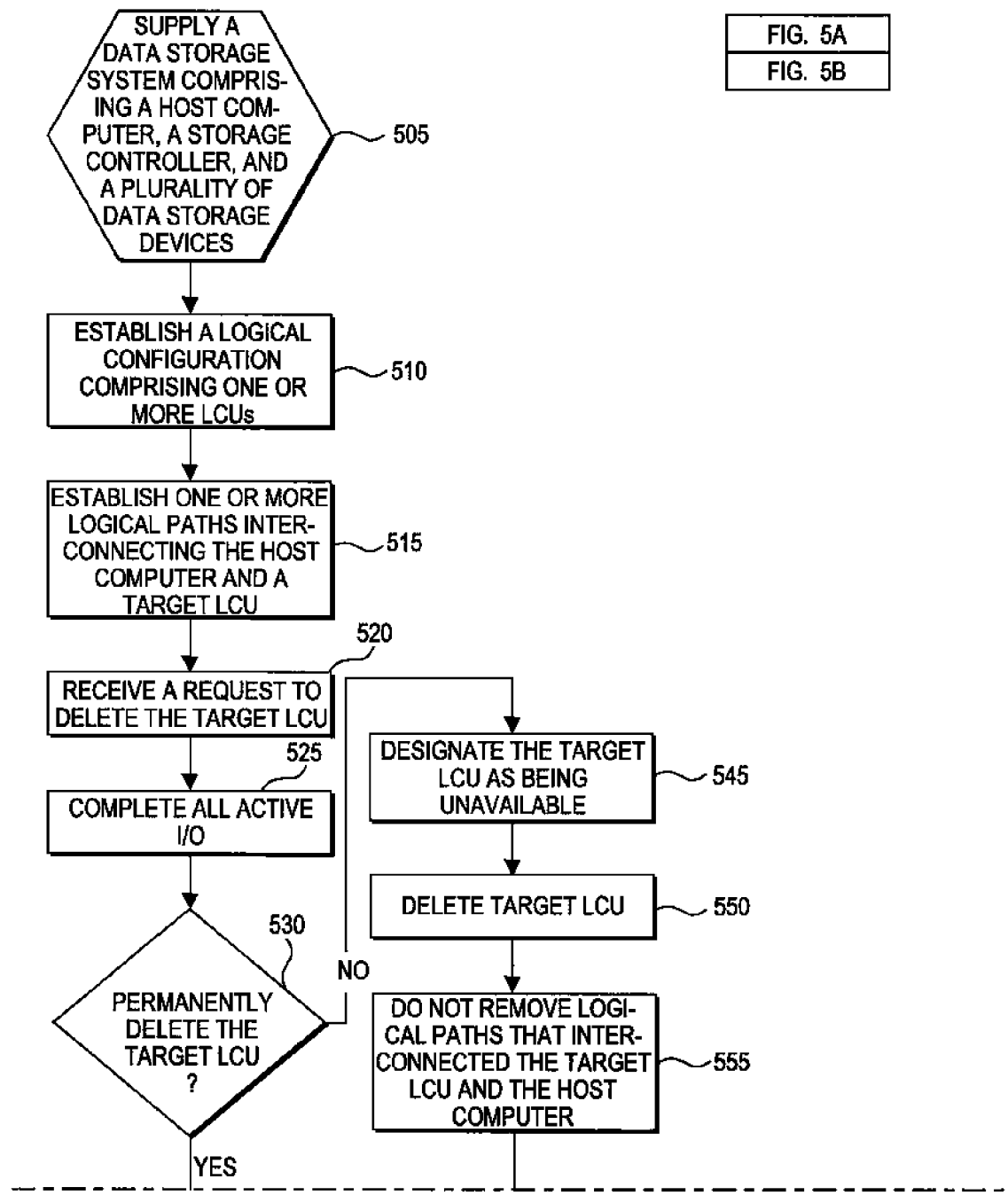
FIGS. 5A and 5B is a flow chart summarizing an exemplary implementation of the discussed method.
Figure 5B:
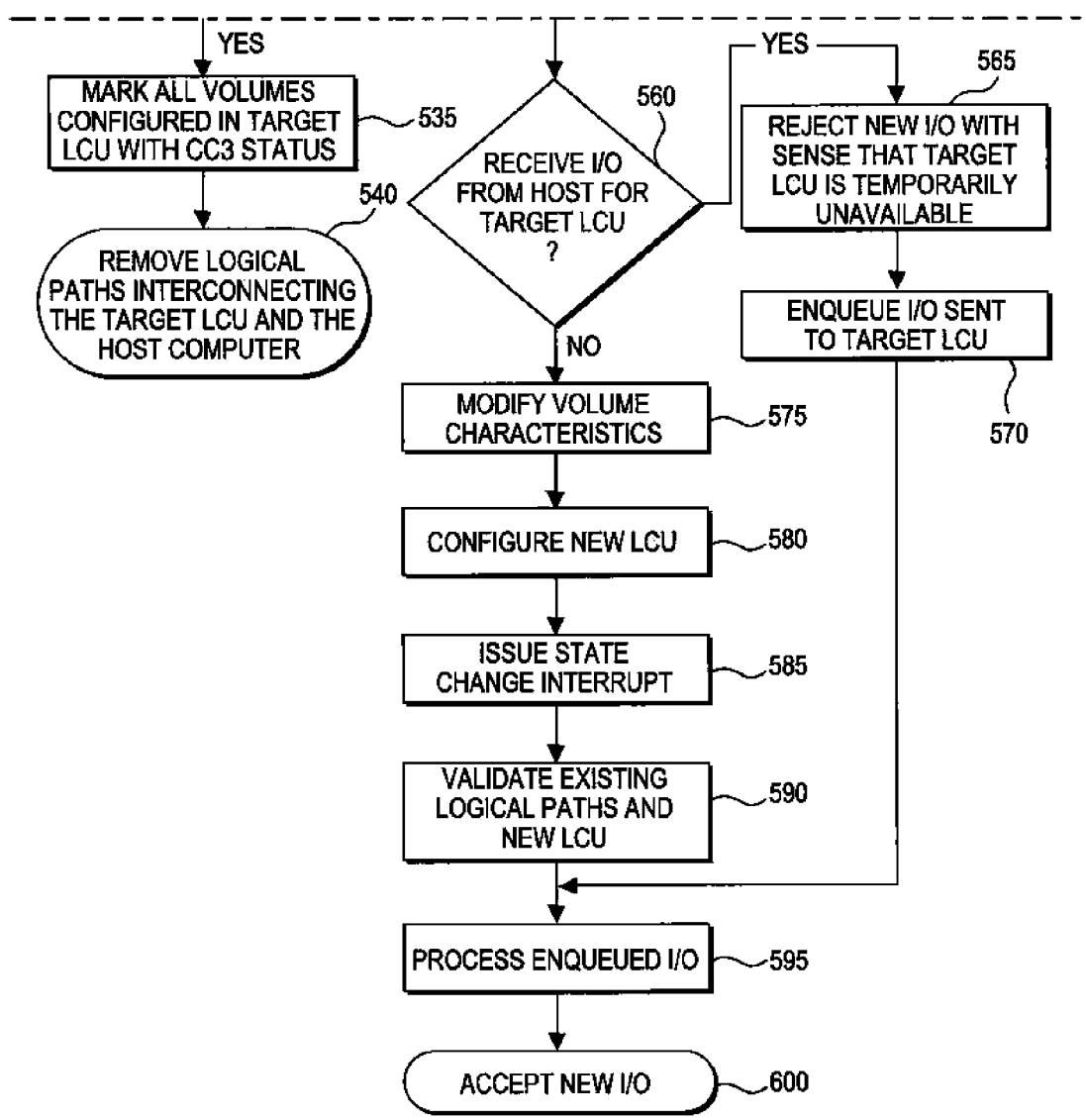

The schematic flow chart diagram included are generally set forth as logical flow-chart diagrams (e.g., FIGS. 5A and 5B). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 5A and 5B). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
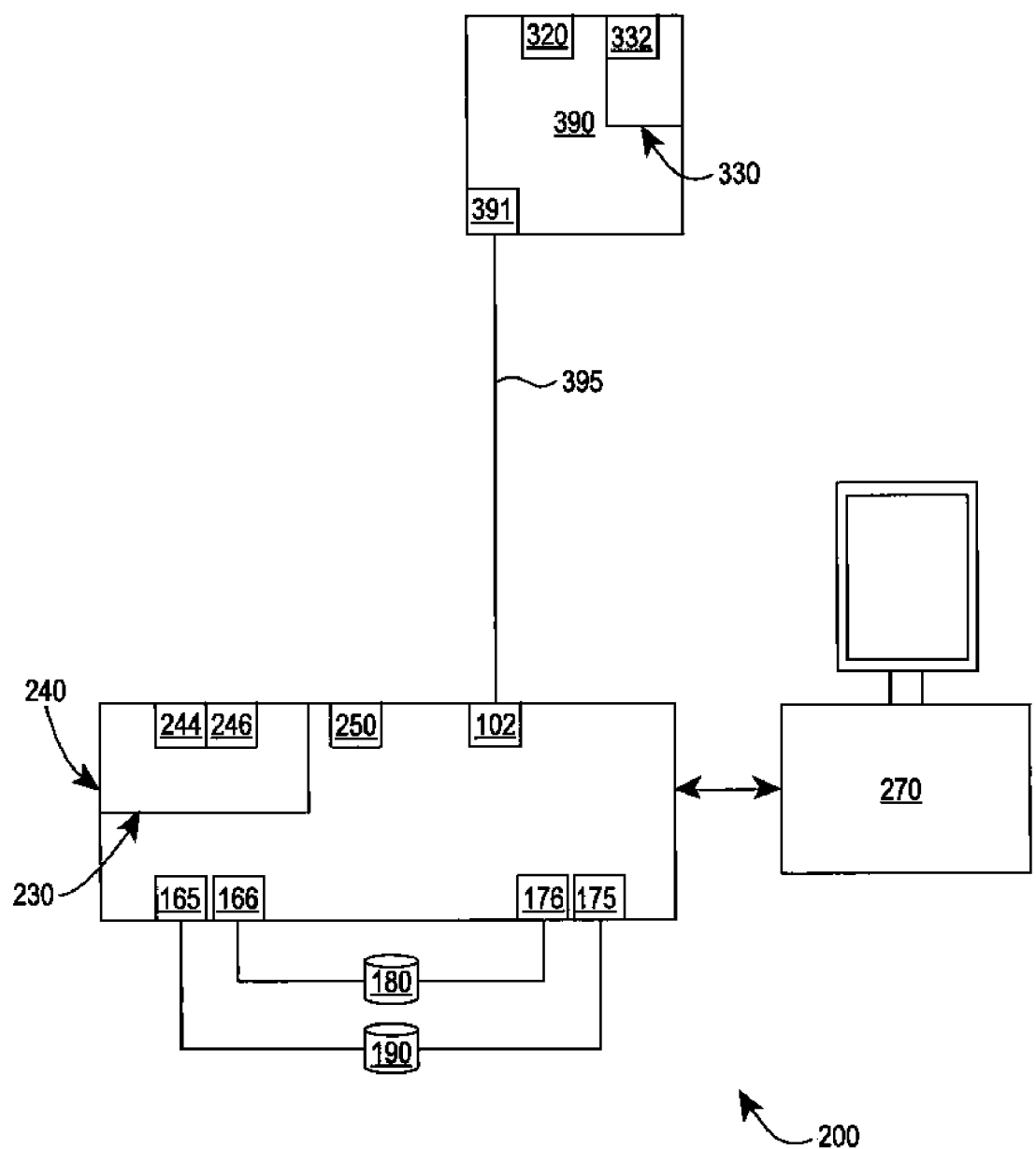
FIG. 1 is a block diagram showing a host computer in communication with a data storage controller.

Referring to FIG. 1, data storage system 200 includes storage controller 240 which interconnects a plurality of data storage drives 180 and/or a plurality of data storage drives 190, with a computing device 390. In the illustrated embodiment of FIGS. 1 and 2, storage controller 240 comprises a computer readable medium 230, a queue 244 written to computer readable medium 230, and instructions 246 written to computer readable medium 230. Storage controller 240 further comprises controller 250, wherein controller 250 utilizes instructions 244 to implement Applicants' method described hereinbelow.

In certain embodiments, storage controller 240 communicates with the plurality of data storage devices 190 via device adapters 165 and 175, and with plurality of data storage devices 180 via device adapters 166 and 176, using an I/O protocol selected from the group consisting of SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

In certain embodiments, computing device 390 comprises a host computer, wherein that host computer generates data, and provides that data to storage controller 240. Storage controller 240 writes that data to one or more of a plurality of data storage devices 180 and/or 190. Further in the illustrated embodiment of FIG. 1, storage controller 240 is in communication with one host computer 390. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

Figure 2:
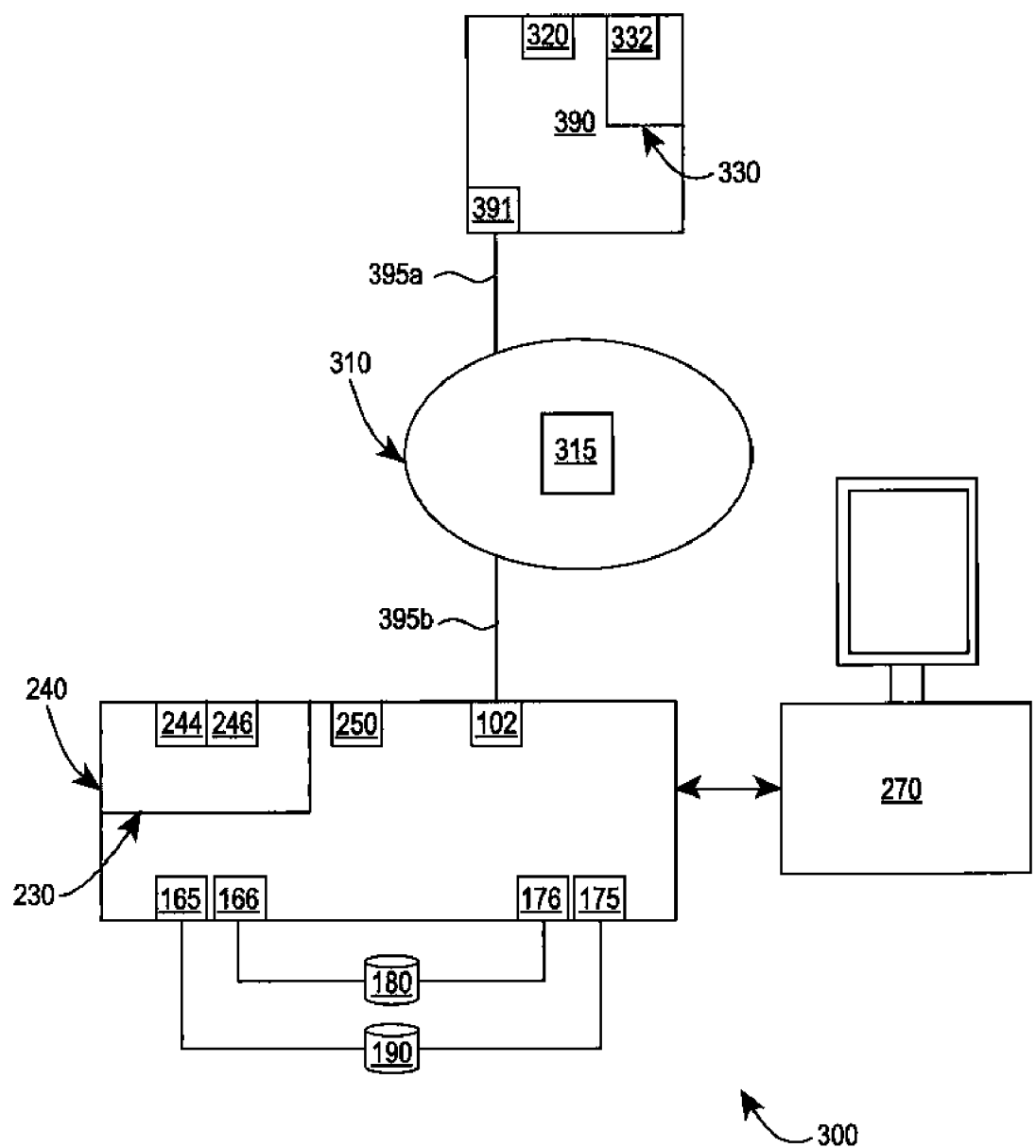
FIG. 2 is a block diagram showing a host computer and a storage controller communicating with one another via fabric.

In the illustrated embodiment of FIG. 2, host computer 390 and storage controller 240 communicate with one another via fabric 310. In certain embodiments, fabric 310 includes, for example, one or more Fibre Channel ("FC") switches 315. In certain embodiments, those one or more switches 315 include one or more conventional router switches. In the illustrated embodiment of FIG. 2, one or more switches 315 interconnect host computer 390 to storage controller 240 via communication paths 395a and 395b, using any type of I/O interface, for example, a Fibre Channel, Infiniband, Gigabit Ethernet, Ethernet, TCP/IP, iSCSI, SCSI I/O interface, or one or more signal lines used by FC switch 315 to transfer information through, to, and from storage controller 240, and subsequently the plurality of data storage devices 180 and/or 190.

Figure 3:
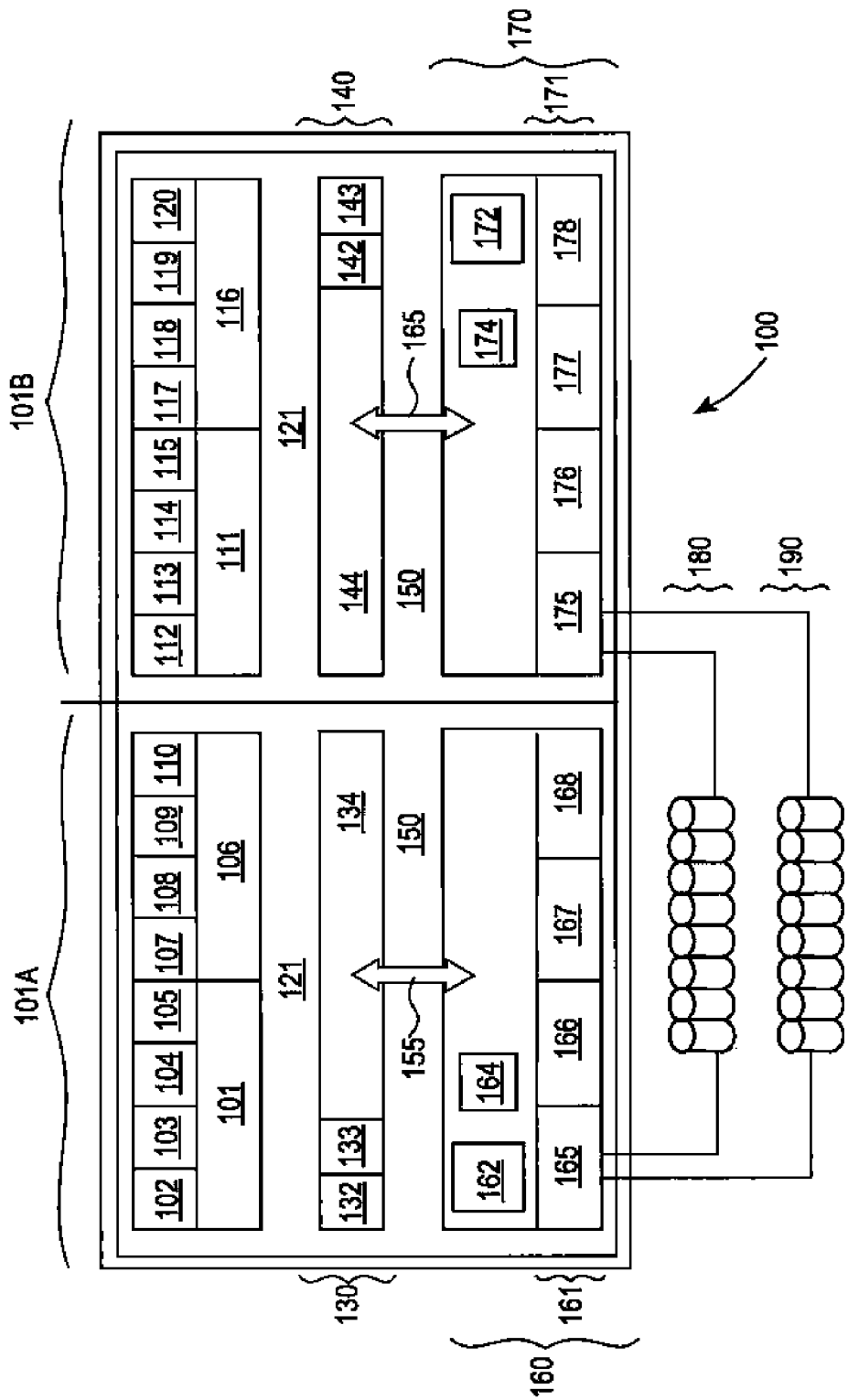
FIG. 3 is a block diagram showing a storage library.

Referring now to FIG. 3, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 3, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may include one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132 and cache 134. In certain implementations, storage controller portion 130 further includes computer readable medium 133. In certain implementations, computer readable medium 133 includes random access memory. In certain implementations, computer readable medium 133 includes non-volatile memory.

Storage controller portion 140 includes processor 142 and cache 144. In certain implementations, storage controller portion 140 further includes computer readable medium 143. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 3, sixteen data storage devices are organized into two arrays, namely array 180 and array 190. The illustrated embodiment of FIG. 3 shows two storage device arrays. In other embodiments, the data storage system includes more than two storage device arrays. Each storage array appears to a host computer as one or more logical devices.

In certain embodiments, one or more of the data storage devices includes a plurality of hard disk drive units, such as plurality of disk drive units 180 and/or 190. In certain embodiments, plurality of disk drive units 180 and/or 190 utilize a RAID (Redundant Array of Independent Disks) protocol. In certain embodiments, plurality of disk drive units 180 and/or 190 comprise what is sometimes called a JBOD array, i.e. "Just a Bunch of Disks" where the array is not configured according to RAID.

The illustrated embodiment of FIG. 3 shows two storage device arrays. In other embodiments, the data storage library 100 includes a single storage device array. In yet other embodiments, data storage library 100 includes more than two storage device arrays.

In the illustrated embodiments of FIGS. 1 and 2 host computer 390 includes a channel path identifiers (CHPid) 391, and is interconnected to host adapter 102 disposed in storage controller 240 via physical communication path 395. The illustrated embodiments of FIGS. 1 and 2 show host computer 390 interconnected with storage controller 240 via one physical communication links. In other embodiments, host computer 390 is interconnected with storage controller with more than one physical communication link.

In certain embodiments, physical communication link 395 may be configured to comprise up to 256 logical communication paths. In certain embodiments, the logical configuration of physical communication link 395 is established by host computer 390. In certain embodiments, the logical configuration of physical communication link 395 is established by storage controller 240. In certain embodiments, the logical configuration of physical communication link 395 is established by a storage system administrator using hardware management console ("HMC") 270.

In the illustrated embodiment of FIGS. 1 and 2, storage controller 240 is in communication with a HMC 270. A system administrator can utilize HMC 270 to, among other things, establish a logical configuration for storage controller 240, plurality of data storage devices 180, and/or plurality of data storage devices 190. In such a logical configuration, storage controller 240, plurality of data storage devices 180, and/or plurality of data storage devices 190, may comprise a plurality of logical control units ("LCUs").

In certain embodiments, a plurality of logical paths may be established for each LCU. In certain embodiments, an LCU may comprise up to 256 volumes. In order to access a volume using different logical paths, up to eight logical paths may be configured into one path group. If one logical path is lost the host can access the LCU using one or more of the additional logical paths in the logical path group. However, when all logical paths are lost the host loses access to the volumes in the LCU. One way this may occur is when the LCU is deleted.

In such a situation, all active input/output (I/O) to the volumes is allowed to complete, while new I/O commands are rejected with a status indication that the one or more volumes specified are not available. Once all volumes in the LCU have been marked with an unavailable status, all logical paths from the host to the LCU are removed.

When the host computer receives notification of the loss of a logical path, the host sends an Establish Logical Path ("ELP") to the storage controller. Because the LCU was deleted, the ELP command is rejected with resources not available. The host computer finally marks the logical path as in a failed state.

Of particular issue is where the LCU may be only temporarily deleted to change the configuration of volumes that belong to the LCU. After the configuration of volumes is updated, a second LCU is recreated, and new volumes are assigned to the second LCU, or certain volumes are deleted from the first LCU to configure the second LCU. At that point, the storage controller is ready for I/O for volumes in the newly created LCU. However, since all logical paths to the host computer have been removed as aforementioned, there is no way to inform the host computer that the LCU and its volumes are available.

As the deletion of the LCU was in a controlled environment, the user may also decide to vary on the volumes after the LCU and volumes are made available. When an volume is varied on, the host computer will start its volume discovery process. However, since no logical path is available, the discovery fails, and the volume is boxed.

One possible solution to the boxed volume problem is to configure off the channel path identifiers (CHPids) associated with the LCU that will be removed. Then after the LCU is restored, the user may vary on the paths. However, this solution requires that the storage system administrator tell all host computer users to stop or terminate their applications because the paths are going to be varied off. Since there could be multiple host computers involved, the storage system administrator must make certain that all CHPids from all the hosts have been configured off. After the LCU and volumes are created again, the storage system administrator can then utilize the hardware management console and configure on the CHPids. This sequence will, hopefully, bring the logical paths back online. The storage system administrator must then vary on all the volumes from all the hosts that were affected with the removal of the LCU.

The configuring off and on of the CHPids is not a satisfactory solution to the situation. The logical paths and path groups are removed when the CHPids are off and the paths are re-established when the CHPids are on. Further, the path groups that are created vary in time. The net result of this is that the host computer's performance is decreased while the paths and path groups are created.

Thus, there is a need for a method to preserve logical paths and path groups after an LCU is deleted. FIGS. 5A and 5B summarizes the steps of an exemplary implementation of Applicants' method to preserve a logical communication path in a data processing system where the data processing system.

In step 505, the method provides a data storage system comprising a host computer, a storage controller, and one or more physical communication links interconnecting the host computer and the storage controller. In certain embodiments, the data processing system includes a host computer comprising a channel path identifier, such as channel path identifier 391 (FIGS. 1, 2). In certain embodiments, the storage controller comprises a data storage library, such as data storage library 100 (FIG. 3), comprising two clusters, such as clusters 101A (FIG. 3) and 101B (FIG. 3), wherein each cluster includes a storage controller portion, such as storage controller portion 130 disposed in cluster 101A and storage controller portion 140 disposed in cluster 101B.

In step 510, the method establishes a logical configuration for the data storage system, wherein that logical configuration comprises a plurality of logical control units ("LCUs"). In certain embodiments, step 510 is performed by the storage controller of step 505. In certain embodiments, step 510 is performed by a storage system administrator using a hardware management console ("HMC"), such as HMC 270, in communication with the storage controller of step 505. In certain embodiments, step 510 is performed by the host computer of step 505.

In step 515, the method configures one or more logical paths interconnecting the host computer and a first LCU. For example in the illustrated embodiment of FIG. 4A, host computer 390 is interconnected with LCU 440 configured in storage controller 240 via three logical paths, namely logical paths 410, 420, and 430.

In certain embodiments, step 515 is performed by the storage controller of step 505. In certain embodiments, step 515 is performed by a storage system administrator using a HMC in communication with the storage controller of step 505. In certain embodiments, step 515 is performed by the host computer of step 505.

In step 520, the method receives a command to delete a first LCU. In certain embodiments, the command of step 520 is generated by the storage controller. In certain embodiments, the command of step 520 is generated by a storage system administrator using a HMC in communication with the storage controller. In certain embodiments, step 520 is performed by the host computer of step 505.

In step 525, the method completes all active I/O for the first LCU. In certain embodiments, step 525 comprises executing all I/O commands designating the first LCU received before the command of step 520 by the storage controller of step 505. In certain embodiments, step 525 is performed by the storage controller of step 505.

In step 530, the method determines if the command of step 520 requires that the first LCU be permanently deleted. In certain embodiments, step 530 is performed by the storage controller of step 505. In certain embodiments, step 530 is performed by a storage system administrator using a HMC in communication with the storage controller of step 505. In certain embodiments, step 530 is performed by the host computer of step 505.

If the method determines in step 530 that the first LCU should be permanently deleted, then the method transitions from step 530 to step 535 wherein the method marks all logical volumes configured in the first LCU with a "CC3" status. In certain embodiments, step 535 is performed by the storage controller of step 505. In certain embodiments, step 535 is performed by a storage system administrator using a HMC in communication with the storage controller of step 505. In certain embodiments, step 535 is performed by the host computer of step 505.

In step 540, the method removes all logical paths interconnecting the first LCU and the host computer of step 505. In certain embodiments, step 515 is performed by the storage controller of step 505. In certain embodiments, step 515 is performed by a storage system administrator using a HMC in communication with the storage controller of step 505. In certain embodiments, step 515 is performed by the host computer of step 505.

If the method determines in step 530 that the first LCU should not be permanently deleted, then the method transitions from step 530 to step 545 wherein the method establishes a first status for the first LCU. In certain embodiments, in step 545 the method designates the first LCU as being temporarily unavailable. In certain embodiments, step 545 is performed by the storage controller of step 505. In certain embodiments, step 545 is performed by a HMC in communication with the storage controller of step 505. In certain embodiments, step 545 is performed by a storage system administrator using a HMC in communication with the storage controller of step 505.

In step 550, the method deletes the first LCU. In certain embodiments, step 550 is performed by the storage controller of step 505. In certain embodiments, step 550 is performed by a HMC in communication with the storage controller of step 505. In certain embodiments, step 550 is performed by a storage system administrator using a HMC in communication with the storage controller of step 505.

Figure 4A:
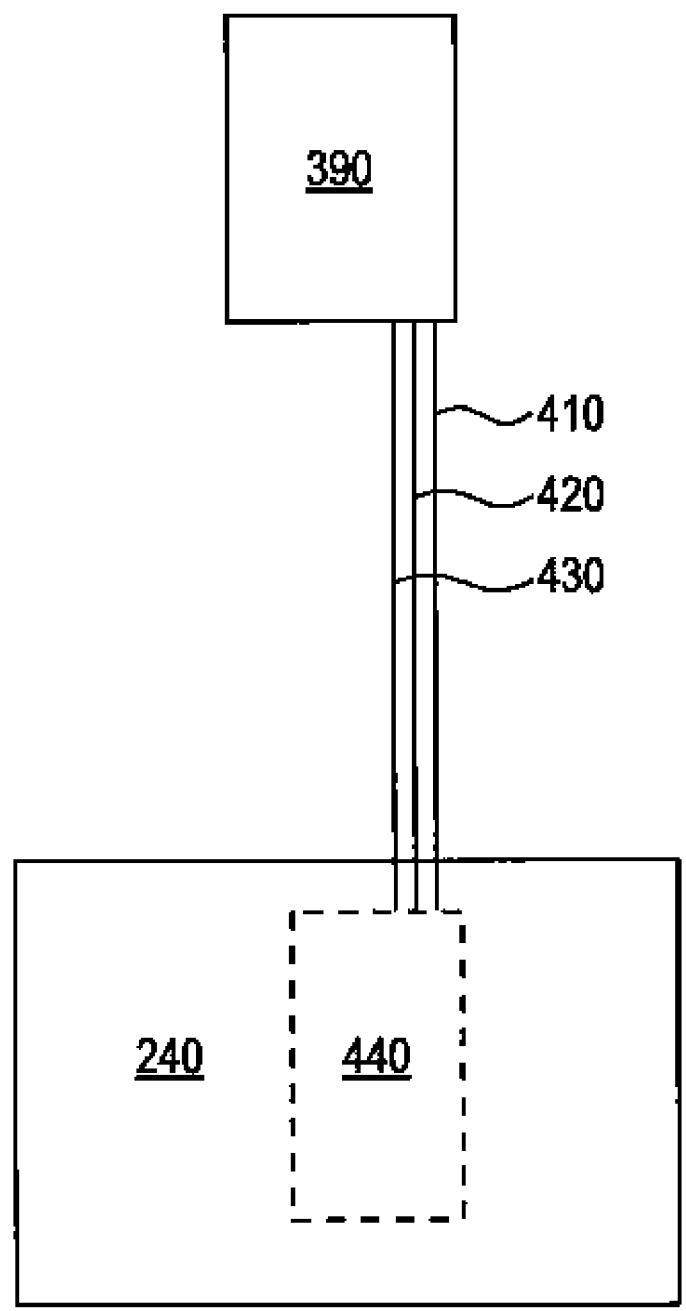
FIG. 4A illustrates a plurality of logical paths interconnecting a host computer and a first logical control unit disposed in a storage controller/storage library.
Figure 4B:
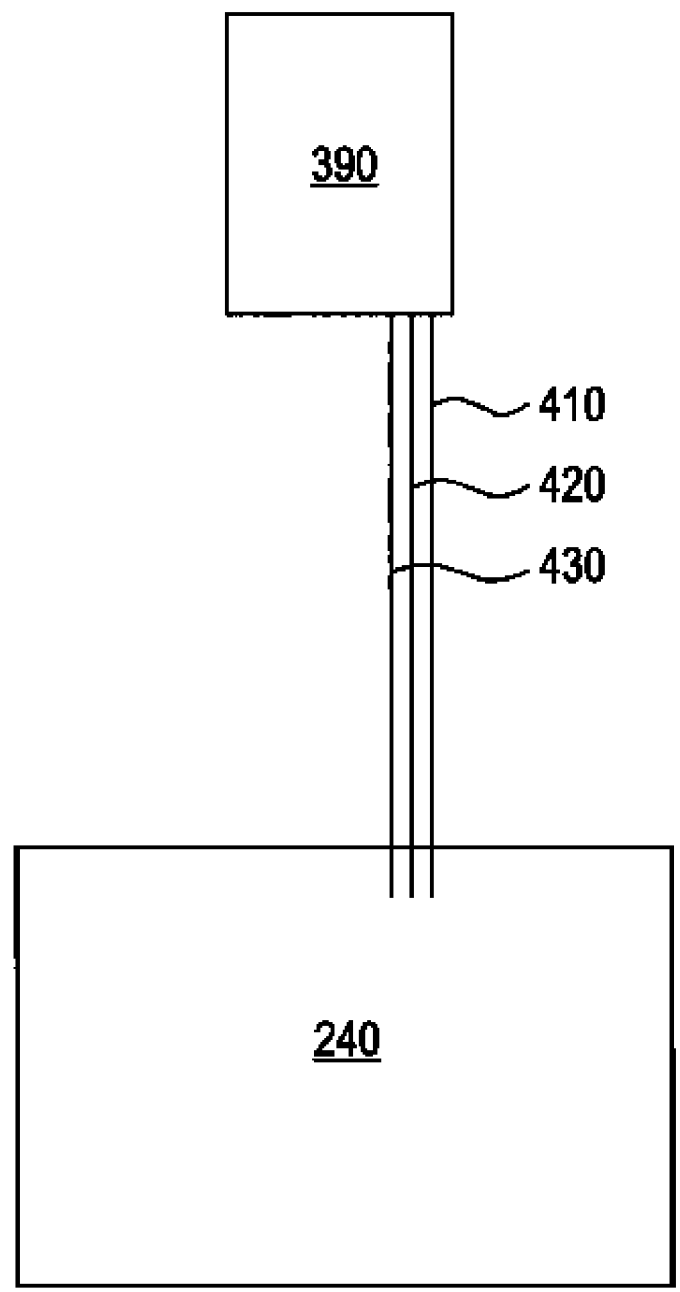
FIG. 4B shows the plurality of logical paths of FIG. 4A being maintained after the first LCU of FIG. 4A has been deleted.
Figure 4C:
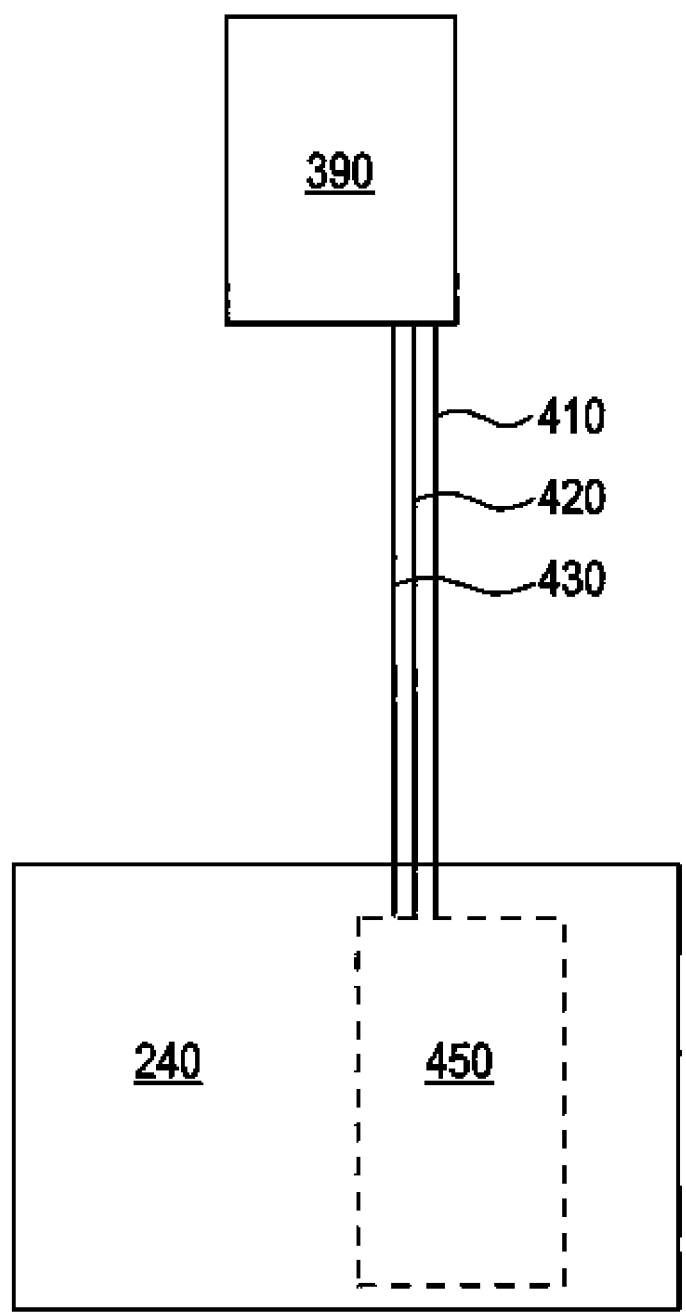
FIG. 4C shows the plurality of logical paths of FIG. 4A interconnected a second LCU and the host computer of FIG. 4A.

In step 555, the method maintains the logical path that previously interconnected the first LCU and the host computer of step 505. In the illustrated embodiment of FIGS. 5A and 5B, step 555 is shown following step 550 and before step 560. Applicants' method maintains the logical path that previously interconnected the first LCU and the host computer of step 505 throughout steps 545 through step 590, inclusive. Referring now to FIGS. 4A and 4B, in the embodiment of FIG. 4B LCU 440 (FIG. 4A) has been deleted but logical paths 410, 420, and 430, have been maintained.

In step 560, the method determines if a new I/O command has been received from the host computer of step 505 after completing all the then-active I/O commands in step 525. In certain embodiments, step 560 is performed by the storage controller of step 505. In certain embodiments, step 560 is performed by a HMC in communication with the storage controller of step 505. In certain embodiments, step 560 is performed by a storage system administrator using a HMC in communication with the storage controller of step 505.

If the method determines that a new I/O command has been received from the host computer of step 505 after completing all the then-active I/O commands in step 525, then the method transitions from step 560 to step 565 wherein the method rejects that new I/O command, and returns a signal to the originating host computer of step 505 that the first LCU is temporarily unavailable. In the illustrated embodiment of FIGS. 5A and 5B, steps 560 and 565 are shown following step 555. Applicants' method performs step 565 anytime new I/O commands are received throughout steps 560 through step 580, inclusive In certain embodiments, step 565 is performed by the storage controller of step 505. In certain embodiments, step 565 is performed by a HMC in communication with the storage controller of step 505. In certain embodiments, step 565 is performed by a storage system administrator using a HMC in communication with the storage controller of step 505.

In step 570, the method enqueues the I/O commands rejected in step 565. In certain embodiments, the rejected I/O commands are enqueued in a queue, such as queue 244 (FIGS. 1, 2), disposed in the storage controller of step 505. In certain embodiments, the rejected I/O commands are enqueued in the host computer of step 505. The method transitions from step 570 to step 595.

In certain embodiments, step 570 is performed by the storage controller of step 505. In certain embodiments, step 570 is performed by a HMC in communication with the storage controller of step 505. In certain embodiments, step 570 is performed by a storage system administrator using a HMC in communication with the storage controller of step 505.

If the method determines that a new I/O command has not been received from the host computer of step 505 after completing all the then-active I/O commands in step 525, then the method transitions from step 560 to step 575 wherein the volume characteristics of the logical volumes previously configured in the first LCU are modified, and/or wherein the volume characteristics of the logical volumes not previously configured in the first LCU are modified.

In certain embodiments, step 575 is performed by the storage controller of step 505. In certain embodiments, step 575 is performed by a HMC in communication with the storage controller of step 505. In certain embodiments, step 575 is performed by a storage system administrator using a HMC in communication with the storage controller of step 505.

In step 580, the method configures a new LCU, i.e. a second LCU, wherein that second LCU comprises all or a portion of the first LCU and wherein the second LCU differs from the first LCU. In certain embodiments, the second LCU comprises a greater number of logical volumes than did the first LCU. In certain embodiments, the second LCU comprises a lesser number of logical volumes than did the first LCU.

In certain embodiments, step 580 is performed by the storage controller of step 505. In certain embodiments, step 580 is performed by a HMC in communication with the storage controller of step 505. In certain embodiments, step 580 is performed by a storage system administrator using a HMC in communication with the storage controller of step 505.

In step 585, the method establishes a second status for the second LCU of step 580. In certain embodiments, step 585 comprises issuing a State Change Interrupt to the host computer of step 505, wherein the State change Interrupt alerts the host computer that the second LCU is available via the one or more logical control paths of step 515. In certain embodiments, step 585 is performed by the storage controller of step 505. In certain embodiments, step 585 is performed by a HMC in communication with the storage controller of step 505. In certain embodiments, step 585 is performed by a storage system administrator using a HMC in communication with the storage controller of step 505.

In step 590, the host computer of step 505 validates the one or more logical paths of 515. In step 595, the method processes any I/O commands previously enqueued in step 570. In step 600, the data storage controller of step 505 accepts new I/O commands specifying the new LCU of step 580 from the host computer of step 505 using the one or more logical control paths of step 515.

In certain embodiments, individual steps recited in FIGS. 5A and 5B may be combined, eliminated, or reordered.

In certain embodiments, instructions, such as instructions 246 (FIGS. 2, 3) residing in computer readable medium 230 (FIGS. 2, 3), and/or instructions 332 residing in computer readable medium 330, wherein those instructions are executed by a processor, 250 (FIGS. 1, 2), and/or 320 (FIGS. 1, 2), to perform one or more of steps 510, 515, 520, 525, 530, 535, 540, 545, 550, 555, 560, 565, 570, 575, 580, 585, 590, 595, and/or 600, recited in FIGS. 5A and 5B.

In other embodiments, the invention includes instructions residing in any other computer program product, where those instructions are executed by a computer external to, or internal to, or data storage system 200 (FIG. 2), or data storage library 300 (FIG. 3), to perform one or more of steps 510, 515, 520, 525, 530, 535, 540, 545, 550, 555, 560, 565, 570, 575,

580, 585, 590, 595, and/or 600, recited in FIGS. 5A and 5B. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compact flash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to preserve a logical communication path in a data processing system, wherein the data processing system comprises a host computer, a storage controller comprising a first logical control unit ("LCU"), and a logical communication path in communication with the host computer and the first LCU, the method comprising:
   deleting the first LCU;
   setting a first status for the first LCU;
   configuring a second LCU comprising all or a portion of the first LCU, wherein the second LCU differs from the first LCU;
   establishing a second status for the second LCU;
   wherein:
   said logical communication path is maintained during said deleting, said setting, said configuring, and said establishing;
   said logical communication path is in communication with said second LCU said data processing system further comprises a hardware management console in communication with said storage controller; and
   said method further comprising receiving a command to delete said first LCU from said hardware management console.

2. The method of claim 1, wherein said storage controller further comprises an I/O queue for storing a plurality of I/O commands, said method further comprising, before said deleting, processing any enqueued I/O commands.

3. The method of claim 2, further comprising:
   receiving, after said deleting, a new I/O command from the host computer;
   enqueuing said new I/O command;
   after said configuring, processing said new I/O command.

4. The method of claim 2, further comprising:
   receiving, after said deleting, a new I/O command from the host computer;
   rejecting said new I/O command;
   signaling said host computer that said LCU is temporarily unavailable.

5. The method of claim 1, further comprising after said configuring, validating said logical communication path.

6. The method of claim 1, wherein said establishing comprises issuing a state change interrupt.

7. A storage controller comprising a first logical control unit ("LCU") and a computer readable medium comprising computer readable program code disposed therein to preserve a logical communication path in communication with a host computer and said first LCU, the computer readable program code comprising a series of computer readable program steps to effect:
   receiving a command to delete said first LCU from a hardware management console;
   deleting the first LCU;
   setting a first status for the first LCU;
   configuring a second LCU comprising all or a portion of the first LCU, wherein the second LCU differs from the first LCU;
   establishing a second status for the second LCU;
   wherein:
   said deleting, said setting, said configuring, and said establishing, are performed without deleting the logical communication path; and
   the logical communication path is in communication with the second LCU.

8. The storage controller of claim 7, further comprising an I/O queue, wherein said computer readable program code further comprises a series of computer readable program steps to effect, before said deleting, processing any I/O commands stored in the I/O queue.

9. The storage controller of claim 8, wherein said computer readable program code further comprises a series of computer readable program steps to effect:
   receiving, after said deleting, a new I/O command from the host computer;
   rejecting said new I/O command.

10. The storage controller of claim 9, wherein said computer readable program code further comprises a series of computer readable program steps to effect signaling said host computer that said LCU is temporarily unavailable.

11. The storage controller of claim 10, wherein said computer readable program code to establish a second status for the second LCU further comprises issuing a state change interrupt.

12. The storage controller of claim 11, wherein said computer readable program code to establish a second status for the second LCU further comprises a series of computer readable program steps to effect accepting I/O commands targeted to said second LCU received from said host computer via said logical path.

13. A computer program product encoded in a computer readable medium, wherein said computer program product is useable with a computer processor to preserve a logical communication path in a data processing system, wherein the data processing system comprises a host computer, a storage controller comprising a first logical control unit ("LCU"), and a logical communication path in communication with the host computer and the first LCU, the computer program product comprising:
   computer readable program code which causes said processor to receive a command to delete the first LCU from a hardware management console in communication with said storage controller;
   computer readable program code which causes said processor to delete the first LCU;
   computer readable program code which causes said processor to set a first status for the first LCU;
   computer readable program code which causes said processor to configure a second LCU comprising all or a portion of the first LCU, wherein the second LCU differs from the first LCU;
   computer readable program code which causes said processor to establish a second status for the second LCU;
   wherein:
   said computer readable program code for deleting, for setting, for configuring, and for establishing, is processed without deleting the logical communication path; and
   the logical communication path is in communication with the second LCU.

14. The computer program product of claim 13, wherein said storage controller further comprises a queue, further comprising computer readable program code which causes said processor to, before deleting said first LCU, process any I/O commands stored in the queue.

15. The computer program product of claim 13, further comprising:
   computer readable program code which causes said processor to receive, after said deleting said first LCU, receive a new I/O command from the host computer;
   computer readable program code which causes said processor to reject said new I/O command;
   computer readable program code which causes said processor to signal said host computer that said LCU is temporarily unavailable.

16. The computer program product of claim 15, wherein said computer readable program code to establish a second status for the second LCU further comprises computer readable program code which causes said processor to issue a state change interrupt.

17. The computer program product of claim 16, wherein said computer readable program code to establish a second status further comprises computer readable program code which causes said processor to process I/O commands for said second LCU received from said host computer via said logical path.

* * * * *